Nov. 16, 1965  D. H. MINEKE  3,217,477

MOUNTING AND FRONT END DRIVE FOR BEET TOPPER

Filed April 20, 1964  2 Sheets-Sheet 1

Dale H. Mineke, INVENTOR.

ATTORNEY.

Nov. 16, 1965  D. H. MINEKE  3,217,477
MOUNTING AND FRONT END DRIVE FOR BEET TOPPER
Filed April 20, 1964  2 Sheets-Sheet 2

Dale H. Mineke, INVENTOR.

BY
ATTORNEY.

3,217,477
MOUNTING AND FRONT END DRIVE FOR BEET TOPPER
Dale H. Mineke, Franklin County, Wash. (P.O. Box 73, Pasco, Wash.)
Filed Apr. 20, 1964, Ser. No. 360,901
1 Claim. (Cl. 56—121.46)

This invention relates generally to flail-type sugar beet toppers mounted on a tractor to provide power and locomotion therefor, and more particularly to such a device that is mounted between the wheels of a wheel type tractor and derives its power from the front-end power take-off of such vehicle.

Beet topping devices of the flexible pivotably mounted rotating flail type have become common in the sugar beet industry for removing the leaf and stem portions of a protruding sugar beet preparatory to harvesting of the understructure. Such devices have in the past taken the form of a separate vehicle propelled by a tractor, but more commonly in recent years they have become attached to the frame of the tractor itself, most generally, in the immediate vicinity of the rear wheels. Such units as have heretofore been used have derived their power from the rear power take-off of the propelling vehicle.

It is desirable in the design and use of such a machine that, for ease and simplicity of operation, the topping and oftentimes associated windrowing device should be mounted between the front and back wheels of a tractor in a position where it is readily observable by the operator. With these factors and this background in mind, it is:

A principal object of the instant invention to provide a mounting and drive for a beet topping device and associated windrower positioning these members between the forward and rearward wheels of a wheel tractor and such that both members receive power from the front-end power take-off of such tractor.

It is another object of the instant invention to provide such a device for mounting particularly upon a four-wheeled tractor of commerce such as the model 3010 or 4010 of the John Deere Company.

It is a still further object of my invention to provide a beet topper mounting and front-end drive of novel design, of simple and rugged nature, and of durability and economy of manufacture.

Other and further objects of my invention will appear from the following drawings, specification and claims which form a part of this application and in which like numbers of reference refer to similar parts throughout.

Figure 1:
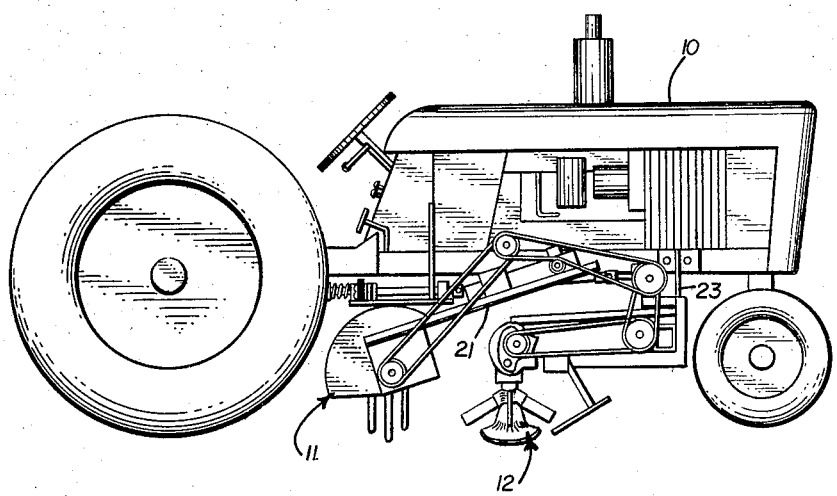
FIGURE 1 is a generalized orthographic side view of a four wheel tractor of commerce showing the general positioning of the beet topping device and windrower mounted thereon between the forward and rearward wheels.
Figure 3:
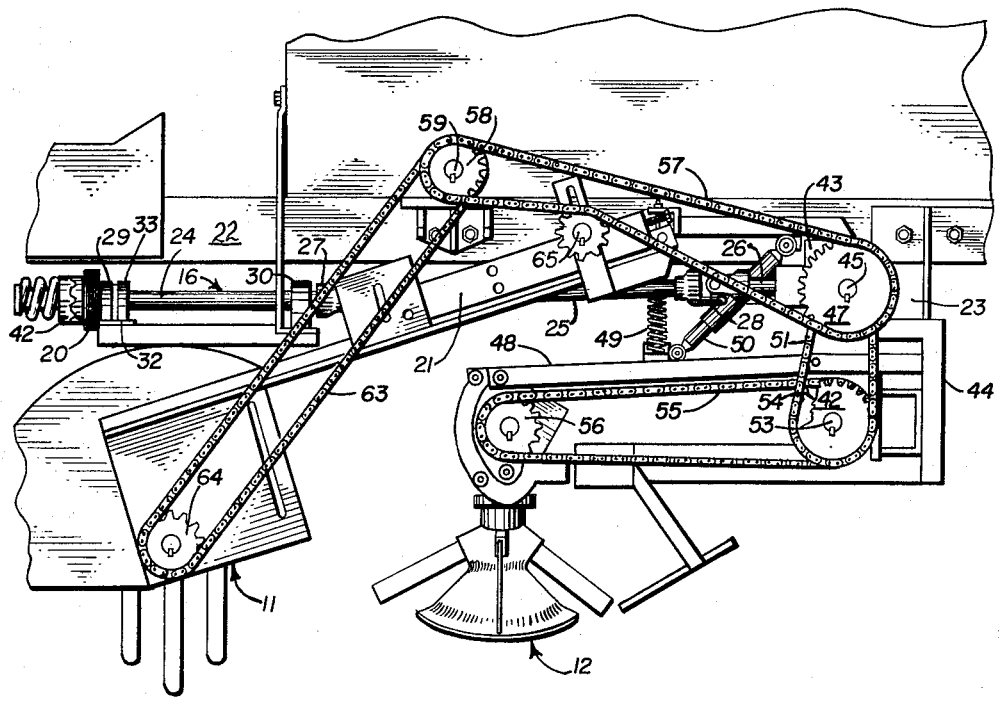
FIGURE 3 is an enlarged orthographic side view of the drive proper, showing the various detailed parts, their relation and operation.
Figure 4:
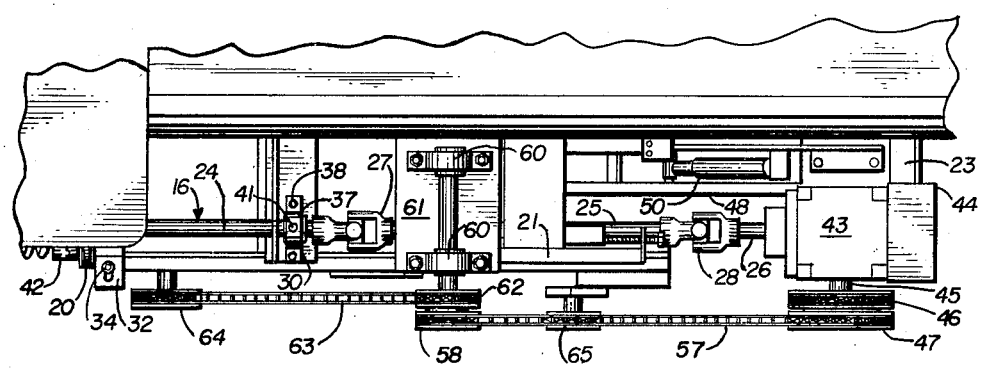
FIGURE 4 is an enlarged orthographic plan view of the same mechanism shown in FIGURE 3, again cooperating with the view of FIGURE 3 to show the detail in structure and operation of the drive.

Referring now to the drawings in more detail, and particularly to that of FIGURE 1, there will be seen the ordinary wheel tractor 10 of commerce carrying on its under frame the beet topper 11 and the windrower 12 immediately forward thereof. The beet topper 11 is the ordinary flexible pivotably mounted rotatable flail variety of commerce; the particular model illustrated is one produced by GEMCO, the General Machinery Company of Ogden, Utah. The windrower attachment 12 is also a standard item of commerce, and again the one illustrated is produced by the same aforesaid manufacturer. The particular invention here involved is the positional mounting of the topper 11 and windrower 12 and the driving linkage transmitting power from the tractor 10 to these individual members 11, 12.

Figure 2:
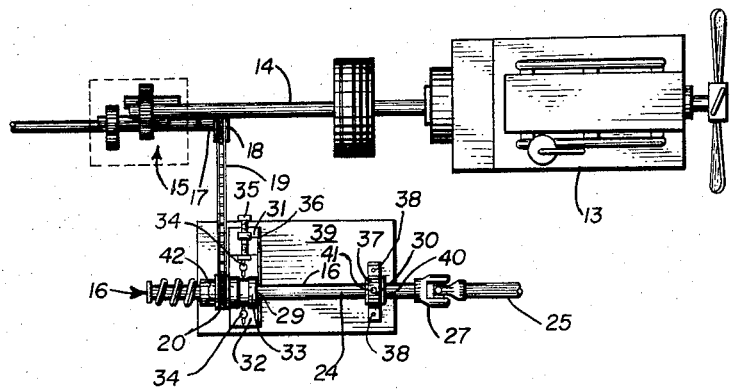
FIGURE 2 is a cut away view of part of the underside of the tractor shown in FIGURE 1, showing the mechanical linkage between the front end power take-off and the primary topper and windrower drive.

The drive from the forward power take-off 15 to the primary topper shaft 16 is best shown in the illustration of FIGURE 2. The motor 13 of tractor 10 produces primary power which is transmitted as a rotary torque to the primary tractor drive shaft 14 which, in turn, transmits this power to the forward power take-off 15. The power is then transmitted through appropriate gearing in the take-off 15 to the forward power take-off shaft 17 and thus to the chain sprocket 18 irrotatably mounted thereon. The power take-off drive chain 19 mates with the chain sprocket 18 and transmits the power imparted thereby to the similar mating chain sprocket 20, irrotatably carried upon the primary topper shaft 16. For the functioning of this type of drive, as described, obviously the primary topper shaft 16 and the drive shaft 14 must be laterally substantially parallel in arrangement as illustrated in FIGURE 2.

The beet topper 11, a manufactured unit of commerce, is mounted by the paired opposed lateral frames 21 extending from the topper 11 to the primary frame 22 of the tractor 10. The windrower 12 is carried by the similar paired opposed lateral frames 23 again communicating to the forward portion of the primary frame 22 of the tractor 10. Both the topper 11 and rower 12 are positioned between the wheels of the tractor 10 substantially as illustrated, and the frames 21, 23 carrying them are preferably adjustable for downward or upward movement, all as well known in the existing art.

The primary topper shaft 16 comprises the rearward member 24 communicating by the universal joint 27 to the middle member 25, which in turn communicates by the universal joint 28 to the forward member 26. This piecemeal structure of the primary topper shaft 16 is necessary to allow angular shaft movement to keep driving chains tight, and to prevent excessive vibration or shock in the driving shaft and its appurtenances.

The rearward member 24 of the primary topper shaft 16 bears, toward its rearward portion, in the laterally adjustable bearing 29, and is rotatably carried toward its forward portion by the rotatably mounted bearing 30. The rearward laterally adjustable bearing 29 has the lower channel member 31 slidably carrying the bearing block 32, which in turn structurally carries the bearing 33 proper. The bearing block 32 is adjustably positioned and fastened relative to the lower channel member 31 by means of the two bolts 34 passing therethrough. It may be moved relative to the channel member 31, to tighten the chain 19, by means of the bolt 35 threadedly engaged in the mating nut 36 which is structurally fastened to the lower channel member 31 preferably by welding. The forward rotatable bearing 30 comprises the outer housing 37 rigidly fastened by the bolts 38 to the plate 39 communicating with the tractor frame 10. The bearing 40 proper is mounted in the frame member 39 so as to rotate axially about the substantially vertical pin 41. This structure is necessary to take up any camber in the rearward topper shaft 24 caused by adjusting the rearward adjustable bearing 29 to tighten the chain 19.

The drive chain sprocket 20 is mounted upon a spring biased one-way clutching device 42, of the type well known in the mechanical arts, to prevent any backlash or stoppage of the motion of the primary topper shaft 16 from doing mechanical damage to the topper drive or the tractor drive.

The middle member 25 of the topper shaft 16 communicates without support between the rearward member 24 and the forward member 26. It nonrotatably carries at its rearward end the one-half part of the universal joint 27 and at its forward end the one-half part of the similar joint 28, both of which members are in turn moveably connected to the adjoining ends of the other members 24, 26 of the topper shaft 16 to form a torque transmitting linkage.

The forward member 26 of the topper shaft 16 communicates from the middle shaft 25 to the mechanical speed reducer 43 of commerce, and has no bearing support except for that of the normal bearings of the mechanical speed reducer 43. The speed reducer 43 is rigidly mounted upon an extension 44 of the forward portion of the under frame 22 of the tractor 10. The speed reducer 43 appropriately reduces the frequency of the torque transmitted through the topper shaft 16 and transmits this power through its take-off shaft 45, the output torque being at right angles to the axis of the input torque. This output shaft 45 irrotatably carries the first and inner windrower take-off sprocket 46 and immediately laterally outward the irrotatably mounted topper take-off sprocket 47.

The windrower assembly 12 proper is carried by the laterally extending windrower frame 48 which in turn is structurally suspended from the cross frame extension 44 structurally communicating from the aforesaid lateral frame 23. Because of the cantilever nature of this structure and its long moment arms, it is preferably additionally supported by springs 49 and shock absorbers 50, as heretofore known in the existing art. The windrower take-off sprocket 46 communicates by the chain 51 to the sprocket 42 irrotatably carried by the stud shaft 53 rotatably journaled in the forward portion of the windrower frame 48. A second sprocket 54 carried irrotatably upon the stud shaft 53 immediately laterally inward of sprocket 42 communicates by the chain 55 to the windrower drive sprocket 56, which in turn transmits the power to drive the windrower unit 12.

The intermediate sprocket 42 should be positioned substantially vertically below the driving sprocket 46, and the line between the two sprockets 42, 46 should, in horizontal relationship, be relatively near the pivot point of the windrower frame 23 upon the primary tractor frame 10. With this arrangement there is little or no slack in either the chain 55 or 51 upon movement of the windrower unit 12 relative to the tractor frame 22.

The topper take-off sprocket 47 communicates by the chain 57 over the idler 65 to the sprocket 58 irrotatably carried on the stud shaft 59. This shaft 59 is rotatably journaled in a bearing 60 mounted upon the bracket 61 structurally communicating with the frame 22 of the tractor 10. A second sprocket 62 irrotatably carried by the stud shaft 59 immediately laterally inward of sprocket 58 communicates by the chain 63 to the drive sprocket 64 of the topper unit 11 proper, to transmit the power modified by the speed reducer 43 to the topper unit 11.

From the mechanical linkages heretofore indicated the operation of my invention can be seen. Power in the form of a rotary torque is transmitted from the forward power take-off 15 of the wheel tractor 10 of commerce to the primary topper shaft 16. This power is then transmitted by the primary topper shaft 16 to the speed reducer 43 and thence through the chain drives indicated to the windrower unit 12 and the topper unit 11, both mounted on separate frames 21, 23 immediately under the tractor frame 22 and between the forward and rearward pairs of wheels, all as readily appears from the appended drawings.

The foregoing description of my invention is necessarily of a detailed and particular nature so that a specific embodiment of it may be set forth as required, but this should not be construed as to prevent various modifications of detail and multiplication and rearrangement of parts which are included within the spirit, essence and scope of my invention as set forth.

Having thusly described my invention, what I claim is:

A mounting and drive mechanism for a beet topper and windrower upon a wheel tractor, comprising, in combination, a flexible pivotable rotatable flail beet topper of commerce adjustably mounted transversely under the underframe of a wheel tractor immediately forward of the rear wheels thereof and a rotatable paddle-type windrower moveably mounted transversely under the underframe of said tractor and substantially parallel to aforesaid topper immediately forward of the topper and rearward of the front wheels of said tractor; and a drive mechanism providing power to each of said units from the front power take-off of said tractor, comprising, a chain drive communicating from said front power take-off, laterally outward, communicating with a mating sprocket carried by a spring loaded one-way clutch irrotatably carried by a primer topper shaft lateral to and substantially parallel with the tractor power take-off shaft, having a rearward member rotatably carried in a rearward laterally adjustable bearing and a forward rotatable mounted bearing, adapted to tighten the aforesaid driving chain communicating therewith, said rearward shaft communicating by a universal joint to a central shaft which in turn communicates by a forward universal joint to a forward drive shaft, adapted to transmit power to a speed reducing device rigidly mounted upon a laterally extending frame communicating structurally with the primary tractor frame; a power take-off shaft associated with said speed reducer transmitting output rotary torque at right angles to the input torque, irrotatably carrying a windrower drive sprocket and a topper drive sprocket; a mechanical linkage comprising a chain driven by said topper drive sprocket communicating to a first sprocket on a stud shaft substantially therebelow so arranged that movement of said windrower causes no slack in the driving chains; irrotatably carrying a second sprocket communicating by second chain to the primary drive sprocket of the laterally extending topper mechanism positioned rearwardly of said second sprocket; a second drive mechanism having a drive chain communicating with the aforesaid topper drive sprocket and a sprocket irrotatably carried by a rotatably mounted stud shaft substantially lateral thereto, having a second sprocket irrotatably carried thereby communicating by a mating chain to the primary drive sprocket of the topper mechanism, and means of maintaining said chains in non-slack operating condition; and means of supplying power to said forward power take-off of said tractor to operate said topper windrower.

References Cited by the Examiner

UNITED STATES PATENTS

| | | | |
|---|---|---|---|
| 2,587,258 | 2/1952 | Wilkinson | 56—121.46 |
| 2,662,361 | 12/1953 | Botimer | 56—121.46 |

ABRAHAM G. STONE, *Primary Examiner.*

ANTONIO F. GUIDA, *Examiner.*